United States Patent
Tamura et al.

(10) Patent No.: US 6,534,583 B1
(45) Date of Patent: Mar. 18, 2003

(54) INORGANIC REINFORCED POLYAMIDE RESIN COMPOSITIONS

(75) Inventors: Tutomu Tamura, Otsu (JP); Hideki Eguchi, Otsu (JP); Tomohide Nakagawa, Otsu (JP); Toshio Hiramatsu, Otsu (JP); Manabu Takeuchi, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/672,807

(22) Filed: Sep. 28, 2000

(30) Foreign Application Priority Data

Sep. 29, 1999 (JP) .............................. 11-277395
Mar. 14, 2000 (JP) ........................... 2000-070433
Aug. 28, 2000 (JP) ........................... 2000-257540

(51) Int. Cl.$^7$ ............................... C08L 77/00
(52) U.S. Cl. ..................... 524/449; 524/538; 525/432
(58) Field of Search .................. 525/432; 524/538, 524/449

(56) References Cited

PUBLICATIONS

Database WPI, Section Ch. Week 199236, Derwent Publications Ltd., London, GB; XP002156785 & JP 04 202358 A (Unitika Ltd.), Jul. 23, 1992.

Database WPI, Section Ch, Week 199203, Derwent Publications Ltd., London, GB; AN 1992–020295 XP002156786 & JP 03 269056 A (Mitsubishi Kasai Corp.), Nov. 29, 1991.

Database WPI, Section Ch. Week 199109, Derwent Publications Ltd., London, GB; AN 1991–061444 XP 002156787 & JP 03 009952 A (Nippon Steel Chem. Co.), Jan. 17, 1991.

Database WPI, Section Ch, Week 199027, Derwent Publications Ltd., London, GB; AN 1990–207233 XP002156788 & JP 02 140265 A (Toyoda Gosei KK), May 29, 1990.

*Primary Examiner*—Ana Woodward
(74) *Attorney, Agent, or Firm*—Kenyon & Kenyon

(57) ABSTRACT

There is disclosed an inorganic reinforced polyamide resin compositions obtainable by melt kneading of (A) a crystalline polyamide rein, (B) a semi-aromatic amorphous polyamide resin, and (C) an inorganic reinforcing material, wherein the relative viscosity of 96% sulfuric acid solution of the composition is 2.1 or lower and wherein the crystallization temperature (TC2) of the composition as measured with a temperature drop by differential scanning calorimetry (DSC) is 180° C. or lower. The inorganic reinforced polyamide resin composition can provide shaped articles having satisfactory strength and rigidity without deteriorating their appearances and further having excellent coating properties and weathering resistance, and requires a mold temperature of 100° C. or lower in the preparation of shaped articles.

5 Claims, 1 Drawing Sheet

INORGANIC REINFORCED POLYAMIDE RESIN COMPOSITIONS

FILED OF INVENTION

The present invention relates to inorganic reinforced polyamide resin compositions comprising crystalline polyamide resins, semi-aromatic amorphous polyamide resins, and inorganic reinforcing materials. More particularly, the present invention relates to inorganic reinforced polyamide resin compositions, which can provide shaped articles having satisfactory strength and rigidity without deteriorating their appearances (e.g., specular surface gloss, evenness of embossed surface) and further having excellent coating properties and weathering resistance, and which require a mold temperature of 100° C. or lower in the preparation of shaped articles. These inorganic reinforced polyamide resin compositions are suitable for automobile exterior parts, particularly door mirror parts.

BACKGROUND OF THE INVENTION

In general, polyamide resins have excellent mechanical characteristics, heat resistance, impact resistance, and chemical resistance; therefore they have been widely used for automobile parts, electrical appliance parts, electronic parts, domestic miscellaneous goods, and other various applications. Among these, polyamide resins reinforced with inorganic materials, typically glass fibers, have remarkably increased rigidity, strength, and heat resistance. In particular, it has been known that rigidity can be improved in proportion to the amounts of reinforcing materials added. However, if reinforcing materials such as glass fibers are added in large quantities, for example, in amounts of 50% to 70% by weight, to polyamide resins for the purpose of improving rigidity and strength, the polyamide resin compositions thus obtained provide shaped articles having extremely deteriorated appearances (e.g., specular surface gloss, evenness of embossed surface), resulting in a remarkable damage to the commercial value of these shaped articles.

Accordingly, for improving the appearances of shaped articles, there have been proposed many methods in which amorphous polyamide resins are added to crystalline polyamide resins (see, e.g., JP-A 2-140265, JP-A 3-9952, JP-A 3-269056, JP-A 4-202358).

These methods, however, cannot provide good specular surface gloss or even surface gloss of embossed surface. Further, there have been known methods for improving strength and rigidity by the addition of nylon-66, glass fibers, and mica in great amounts to semi-aromatic polyamide resins (MXD-6) (see, e.g., JP-A 1-263151). In this case, however, the temperature of a mold used in the preparation of shaped articles should be increased to high temperatures, for example, 135° C., or even if the mold temperature is increased to such high temperatures, the shaped articles thus obtained may sometimes have no good appearances.

SUMMARY OF THE INVENTION

Under these circumstances, the present inventors have extensively studied to develop a polyamide resin composition, which can provide shaped articles having satisfactory strength and rigidity without deteriorating their appearances and further having excellent coating properties and weathering resistance, and which requires a mold temperature of 100° C. or lower in the preparation of shaped articles, even if reinforcing materials such as glass fibers are added in large quantities, for example, in amounts of 50% by weight or higher, to polyamide resins for the purpose of improving strength and rigidity.

As a result, they have found that such a polyamide resin composition can be obtained by the combination of (A) a crystalline polyamide resin, (B) a semi-aromatic amorphous polyamide resin, and (C) an inorganic reinforcing material, and by the control of relative viscosity and crystallization temperature as measured with a temperature drop, of the composition after melt kneading of these ingredients, thereby completing the present invention.

Thus the present invention provides an inorganic reinforced polyamide resin composition obtainable by melt kneading of (A) a crystalline polyamide rein, (B) a semi-aromatic amorphous polyamide resin, and (C) an inorganic reinforcing material, wherein the relative viscosity of 96% sulfuric acid solution of the composition is 2.1 or lower and wherein the crystallization temperature (TC2) of the composition as measured with a temperature drop by differential scanning calorimetry (DSC) is 180° C. or lower.

DETAILED DESCRIPTION OF THE INVENTION

Figure 1:
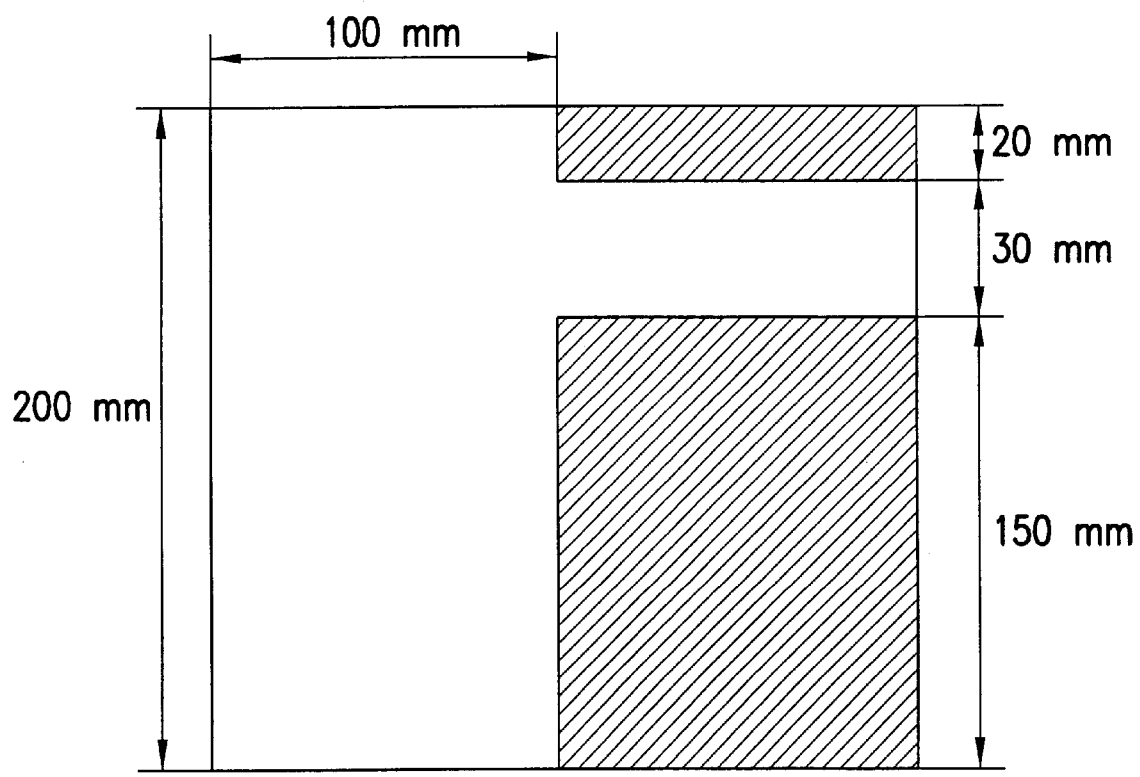
FIG. 1 is a plan view of a mold used in the evaluation of the inorganic reinforced polyamide resin compositions of the present invention for evenness of embossed surface.

The inorganic reinforced polyamide resin composition of the present invention is obtainable by melt kneading of (A) a crystalline polyamide resin, (B) a semi-aromatic amorphous polyamide resin, and (C) an inorganic reinforcing material.

The crystalline polyamide resin as the ingredient (A) in the present invention may include nylon 6, nylon 11, nylon 12, nylon 46, nylon 66, nylon 610, nylon 612, and their copolymers and blends. In the present invention, preferred are polycapramide resins, usually called "nylon 6", which can be obtained by the polycondensation of $\epsilon$-caprolactam.

The relative viscosity of 96% sulfuric acid solution of the above crystalline polyamide resin may preferably be in the range of 1.6 to 3.5, more particularly in the range of 1.7 to 2.5. For the crystalline polyamide resin, if the relative viscosity of 96% sulfuric acid is lower than 1.6, the composition provides shaped articles having decreased toughness, which is not preferred. In contrast, if the relative viscosity is higher than 3.5, the composition has decreased flowability and therefore cannot provide shaped articles having desired appearances, which is also not preferred.

The semi-aromatic amorphous polyamide resin as the ingredient (B) in the present invention refers to polymers obtained from monomeric materials including adipic acid, terephthalic acid, isophthalic acid, trimethylhexamethylenediamine, hexamethylenediamine, m-xylylenediamine, and $\epsilon$-caprolactam. Specific examples thereof are, but not particularly limited to, polymers of hexamethylenediamine and terephthalic acid; polymers of hexamethylenediamine and isophthalic acid; polymers of hexamethylenediamine, terephthalic acid, and isophthalic acid; polymers of hexamethylenediamine, terephthalic acid, and adipic acid; polymers of hexamethylenediamine, terephthalic acid, and $\epsilon$-caprolactam; polymers of m-xylylenediamine and adipic acid; polymers of trimethylhexamethylenediamine and terephthalic acid; polymers of trimethylhexamethylenediamine, terephthalic acid, and ε-caprolactam; polymers of trimethylhexamethylenediamine, terephthalic acid, and isophthalic acid; copolymers of terephthalic acid, isophthalic acid, hexamethylenediamine, and ε-caprolactam; and copolymers of m-xylylenediamine, terephthalic acid, isophthalic acid, and ε-caprolactam.

The relative viscosity of 96% sulfuric acid solution of the above semiaromatic amorphous polyamide resin may preferably be in the range of 1.6 to 3.5, more preferably in the range of 1.7 to 2.5. For the semi-aromatic amorphous polyamide resin, if the relative viscosity of 96% sulfuric acid is lower than 1.6, the composition provides shaped articles having decreased toughness, which is not preferred. In contrast, if the relative viscosity is higher than 3.5, the composition has decreased flowability and therefore cannot provide shaped articles having desired appearances, which is also not preferred.

The ingredient (C) in the present invention is an inorganic reinforcing material, specific examples of which are fiber-shaped inorganic reinforcing materials such as glass fibers, needle-shaped wollastonite, whiskers, carbon fibers, and ceramic fibers; and powdered inorganic reinforcing materials such as silica, alumina, talc, kaolin, quartz, glass, mica, and graphite. Preferred inorganic reinforcing materials are glass fibers, powdered glass (milled fibers), mica, talc, non-calcined clay, and needle-shaped wollastonite. These inorganic reinforcing materials can be used alone or in combination. In the present invention, preferred are combinations of glass fibers and plate crystal inorganic reinforcing materials such as mica, talc, and non-calcined clay. When these inorganic reinforcing materials are used as reinforcing material of polyamide resins, they may be those which have usually been treated with an amino silane as a surface-treatment agent.

The total amount of ingredients (A) and (B) to be added may usually be 30 to 50 parts by weight, preferably 35 to 45 parts by weight, and more preferably 38 to 42 parts by weight, relative to 100 parts by weight of ingredients (A), (B), and (C) in total. The mixing ratio of ingredients (A) and (B) is not particularly limited, but the amount of ingredient (B) to be added may preferably be 12% to 50% by weight, more preferably 20% to 40% by weight, relative to the total amount of ingredients (A) and (B) to be added. Smaller amounts of ingredient (B) to be added are not preferred because the composition cannot provide shaped articles having good appearances. In contrast, greater amounts of ingredient (B) to be added are also not preferred because the crystal solidification of shaped articles becomes poor to cause their adhesion in a mold used in the preparation or the shaped articles have decreased hot-rigidity. Further, for the same reasons as described above, the amount of ingredient (B) to be added may preferably be 5% to 20% by weight, more preferably 7% to 17% by weight, relative to the total weight of the composition.

The amount of ingredient (C) to be added may usually be 50 to 70 parts by weight, preferably 52 to 67 parts by weight, and more preferably 55 to 65 parts by weight, relative to 100 parts by weight of ingredients (A), (B), and (C) in total. For ingredient (C), amounts smaller than 50 parts by weight are not preferred because the composition provides shaped articles having decreased strength and rigidity. In contrast, amounts greater than 70 parts by weight are also not preferred because the composition cannot provide shaped article having good appearances.

For the inorganic reinforced polyamide resin composition of the present invention, the relative viscosity of 96% sulfuric acid solution of the composition may usually be 2.1 or lower, preferably 1.6 to 2.1, more preferably 1.7 to 2.0, and still more preferably 1.8 to 1.9. If the relative viscosity is higher than 2.1, the composition cannot provide shaped articles having good appearances, which is not preferred.

The 96% sulfuric acid solution of the inorganic reinforced polyamide resin composition of present invention refers to a solution obtained by the addition of 96% sulfuric acid to the composition obtained by melt kneading of ingredients (A), (B), and (C), followed by dissolution, and the solution mainly contains polyamide resins.

The following will describe a method for the measurement of relative viscosity in the present invention. First, 5 g of the inorganic reinforced polyamide resin composition of the present invention is put in a crucible and then calcined at 600° to 700° C. to remove organic materials (mainly polyamide resins). The amount of inorganic reinforcing materials is accurately determined by a change in weight. The inorganic reinforced polyamide resin composition of the present invention is sampled so that the amount of organic materials comes to 250 mg by calculation, to which 25 ml of 96% sulfuric acid is added, and the organic materials are completely dissolved. After that, the sulfuric acid solution (mainly containing polyamide resins) is separated from the sulfuric acid insoluble residue (mainly containing inorganic reinforcing materials) with a glass filter, or by a centrifugal separator or other means, and the viscosity of the sulfuric acid solution is measured according to JIS K 6810.

For the inorganic reinforced polyamide resin composition of the present invention, the crystallization temperature (TC2) of the composition as measured with a temperature drop by differential scanning calorimetry (DSC) may usually be 180° C. or lower, preferably 178° C. or lower, and more preferably 175° C. or lower. The crystallization temperature (TC2) as measured with a temperature drop in the present invention can be determined by differential scanning calorimetry (DSC) under a stream of nitrogen gas by increasing the temperature to 300° C. at a rate of 20° C./min., keeping the sample composition at that temperature for 5 minutes, and decreasing the temperature to 100° C. at a rate of 10° C./min. If the crystallization temperature (TC2) as measured with a temperature drop is higher than 180° C., the composition cannot provide shaped articles having good appearances.

In the present invention, to obtain an inorganic reinforced polyamide rein composition having a relative viscosity of 2.1 or lower as measured by sulfuric acid solution, various methods can be employed, for example, the use of crystalline polyamide resins having ultra-low viscosity (relative viscosity of 1.6 to 2.1), or the use of conventional polyamide resins and the addition of molecular chain breaking agents for these polyamide resins in the compounding.

For the inorganic reinforced polyamide resin composition of the present invention, the melt flow index (MFI) of the composition at a water content of 0.05% or lower as measured at 275° C. under a load of 2160 g may preferably be 2.0 g/10 min. or higher. If the melt flow index is lower than 2.0 g/10 min., the composition cannot provide shaped articles having good appearances. To obtain an inorganic reinforced polyamide resin composition having a melt flow index of 2.0 g/10 min. or higher, the use of only conventional crystalline polyamides having a relative viscosity of 2.3 or higher cannot make the value of melt flow index reach the above range (i.e., lower than 2.0 g/10 min.), and various methods can be employed, for example, the use of crystalline polyamide resins having ultra-low viscosity (relative viscosity of 1.7 to 2.2), or the use of conventional polyamide reins and the addition of molecular chain breaking agents for these polyamide resins in the compound processing.

For the molecular chain breaking agent (also referred to as viscosity-reducing agent), aliphatic dicarboxylic acids and aromatic dicarboxylic acids are effective. Specific examples thereof are, but not particularly limited to, oxalic acid, malonic acid, succinic acid, adipic acid, azelaic acid, sebacic acid, phthalic acid, and terephthalic acid. The amount of molecular chain breaking agent to be added may usually be about 0.1 to 3 parts by weight, relative to 100 parts by weight of ingredients (A) and (B) in total, in which range the inorganic reinforced polyamide resin composition of the present invention has a relative viscosity of 2.1 or lower as measured by sulfuric acid solution and a melt flow index of 2.0 g/10 min. as measured at 275° C. under a load of 2160 g. The effects of the molecular chain breaking agent may vary according to the conditions of compounding (melt kneading and extrusion), and of course, higher compounding temperatures or longer polymer residence times in the compounding make those effects more excellent. The compounding temperature may usually be in the range of 240° C. to 300° C., and the polymer residence time in the compounding may usually be within 15 to 60 seconds.

In the present invention, the relative viscosity of sulfuric acid solution of the composition may also be made to 2.1 or lower by the addition of other ingredients or by the use of a particular compounding method, instead of adding a molecular chain breaking agent as described above, and this is not limited to the above method. There may also be some cases in which the relative viscosity comes to 2.1 or lower by the addition of ingredient (D) as described below.

For the improvement of coating properties, the inorganic reinforced polyamide resin composition of the present invention may preferably comprise an organic compound containing at least 4% by weight of hydroxyl groups (—OH) as ingredient (D). Specific examples thereof are, but not particularly limited to, terpene phenol resins, ethylene-vinyl alcohol copolymers, and polyols such as pentaerythritol, trimethylolpropane, and trimethyloletahne. Among these, terpene phenol resins having molecular weights of 300 or higher are particularly preferred. The "terpene" is a general term for natural hydrocarbon compounds from pine oil or other raw materials, and after purification, it is used as a raw material. In the present invention, particularly preferred are, but not particularly limited to, dipentene-phenol copolymers and α-pinene-phenol copolymers.

The amount of ingredient (D) to be added may usually be not more than 15 parts by weight, preferably 0.5 to 15 parts by weight, more preferably 0.8 to 8 parts by weight, and still more preferably 1 to 3 parts by weight, relative to 100 parts by weight of ingredients (A), (B), and (C) in total. For ingredient (D), amounts smaller than 0.5 part by weight are not preferred because only small effects are produced on the improvement of coating adhesion. In contrast, amounts greater than 15 parts by weight are also not preferred because mechanical and thermal characteristics are deteriorated.

As described above, the terpene phenol resin used as the ingredient (D) may preferably have a molecular weight of 300 or higher, more preferably 500 or higher. Terpene phenol resins having molecular weights of lower than 300 are not preferred because they have poor thermal stability and therefore cause decomposition, scattering, and other troubles in the processing.

The reason that coating adhesion can be improved by the addition of ingredient (D) seems to be the improvement of reactivity and compatibility with coating materials.

The inorganic reinforced polyamide resin composition of the present invention may preferably further comprise (E) carbon black as an improver of weathering resistance. The amount of carbon black to be added may usually be 0.5 to 10 parts by weight, preferably 2 to 9 parts by weight, relative to 100 parts by weight of ingredients (A), (B), and (C) in total. For ingredient (E), amounts smaller than 0.5 part by weight are not preferred because only small effects are produced on the weathering resistance.

The inorganic reinforced polyamide resin composition of the present invention may further comprise (F) a copper compound and/or (G) an alkali metal halide compound as an auxiliary agent(s) for weathering resistance.

Specific examples of the copper compound are cuprous chloride, cuprous bromide, cuprous iodide, cupric chloride, cupric bromide, cupric iodide, cupric phosphate, cupric pyrophosphate, copper sulfate, copper nitrate, copper acetate and copper salts of other organic carboxylic acids. These copper compounds may be used alone or in combination. The amount of copper compound to be added may usually be 0.01 to 1 part by weight, preferably 0.02 to 0.8 part by weight, relative to 100 parts by weight of ingredients (A), (B), and (C) in total.

Specific examples of the alkali metal halide compound are lithium chloride, lithium bromide, lithium iodide, lithium fluoride, sodium chloride, sodium iodide, potassium chloride, potassium bromide, potassium iodide, and potassium fluoride. Among these, particularly preferred is potassium iodide. These alkali metal halide compounds may be used alone or in combination. The amount of alkali metal halide compound to be added may usually be 0.05 to 2 parts by weight, preferably 0.10 to 0.30 part by weight, relative to 100 parts by weight of ingredients (A), (B), and (C) in total.

The inorganic reinforced polyamide resin composition of the present invention may further comprise, if necessary, in addition to the above ingredients, optical or thermal stabilizers, antioxidants, ultraviolet light absorbers, light stabilizers, plasticizers, lubricants, crystal core agents, release agents, antistatic agents, flame retardants, pigments, dyes, or other kinds of polymers.

For the optical or thermal stabilizers, phenol-type antioxidants and phosphorous-type antioxidants may preferably be used in combination. The phenol-type antioxidants are not particularly limited, so long as they are of the single-hindered type or of the double-hindered type. The antioxidants may preferably be of the phosphorous type, which are not particularly limited to, so long as they contain trivalent or pentavalent phosphorous in their compounds, and which are commercially available. Further, copper-type antioxidants may be used. For the release agents, metal salts of stearic acid, montanic acid salts and their esters are preferred. For the flame retardants, combinations of halogen-type flame retardants and antimony trioxide are preferred, and for the halogen-type flame retarders, brominated polystyrenes are preferred. For the non-halogen-type flame retardants, melamine cyanurates, magnesium hydroxide, and other compounds are preferred.

The method for preparing the inorganic reinforced polyamide resin composition of the present invention comprises mixing at least ingredients (A), (B), and (C) as described above, and if necessary, further ingredients (D) to (G), at the above mixing ratio in any order of mixing, followed by melt kneading. The melt kneading may be carried out by any of the known methods, in which single-screw extruders, double-screw extruders, kneaders, Banbury mixers, roll mills, or other means can be used. In particular, the use of a double-screw extruder is preferred. Further, glass fibers, needle-shaped wollastonite, and other materials, which are liable to break in the extrusion processing, may preferably be, but are not particularly limited to, put into the side feed opening of a double-screw extruder.

The inorganic reinforced polyamide resin composition of the present invention may be shaped into various articles by any of the known methods, such as injection, extrusion, blow or other molding techniques, and it can find many applications, for example, automobile parts, such as door mirror stays and cup holders; electrical and electronic parts of breakers, electrical tools, and other appliances; sports and leisure goods, such as fishing tackle (e.g., sheets, reels); and materials for civil engineering and construction. The inorganic reinforced polyamide resin composition of the present invention is particularly suitable for door mirror stays and cup holders.

EXAMPLE

The present invention will hereinafter be further illustrated by some examples; however, the present invention is not limited to these examples.

The characteristics and physical properties shown in the following Examples and Comparative Examples were determined by the test methods as described below (the contents of JIS standards and ASTM documents are incorporated herein by reference).

(1) Relative Viscosity (Method by Sulfuric Acid Solution):

The relative viscosity was measured by 96% sulfuric acid solution according to JIS K 6810.

(2) Crystallization Temperature (TC2) as Measured with a Temperature Drop:

The crystallization temperature (TC2) as measured with a temperature drop was determined by differential scanning calorimetry (DSC) under a stream of nitrogen gas by increasing the temperature to 300° C. at a rate of 20° C./min., keeping a sample composition at that temperature for 5 minutes, and decreasing the temperature to 100° C. at a rate of 10° C./min.

(3) Water Content (Karl Fischer Method):

The water content was measured according to JIS K 6810.

(4) Melt Flow Index (MFI):

The melt flow index (MFI) was measured at 275° C. under a load of 2160 g according to JIS K 7210.

(5) Tensile Strength:

The tensile strength was measured according to ASTM D-638.

(6) Tensile Modulus of Elasticity:

The tensile modulus of elasticity was measured according to ASTM D-638.

(7) Specular Gloss:

With a specularly-finished mold of 100 mm×100 mm in size and 3 mm in thickness, a shaped article was prepared at a resin temperature of 280° C. and at a mold temperature of 80° C., and then measured for gloss at an incident angle of 60° according to JIS Z 8714 (larger values indicate higher gloss).

The evaluation was carried out on the criteria: gloss values of 92 or higher: ○, gloss values of 91 to 75: Δ, and gloss values of 74 or lower: X.

(8) Evenness of Embossed Surface:

With an embossed, plate-shaped mold (a plan view thereof is shown in FIG. 1, and the shaded area in FIG. 1 represents a portion of the mold, into which a resin is not introduced), molding was carried out at a resin temperature of 285° C. and at a mold temperature of 80° C. to prepare a shaped article of 2.5 mm in thickness, which was then evaluated for evenness of embossed surface by visual observation.

Criteria of evaluation:

○ mark: the transfer of an embossed pattern is good all over the surface and there is no uneven gloss;

Δ mark: the transfer of an embossed pattern is different in part and there is slight uneven gloss;

X mark: the transfer of an embossed pattern is greatly different in part and there is remarkable uneven gloss, and such a shaped article cannot be used for exterior parts.

(9) Weathering Resistance:

With a sunshine weatherometer (SWOM), testing was carried out at a panel temperature of 63° C., at a humidity of 50% RH, and at a spray cycle of irradiation for 120 minutes and rainfall for 18 minutes, and the specular gloss of a shaped article was measured after 500 hours of irradiation time.

The evaluation was carried out on the criteria: gloss values of 50 or higher: ○, gloss values of 49 to 30: Δ, and gloss values of 29 or lower: X.

(10) Evaluation of Coating Adhesion:

Paint used: acrylic paint available from Dai Nippon Toryo Co., Ltd.; trade name: PLANIT PA Coating method: using a spray gun; coating thickness, about 30 μm Baking temperature: 80° C.×40 minutes Method of evaluation: according to JIS K 5400-1990 for adhesion strength Initial coating adhesion: a shaped article after baking of a coating was left for one day, and then measured for adhesion strength and evaluated on the criteria described below.

Water-resistant coating adhesion: a shaped article after baking of a coating was left for one day, and then treated by immersion in warm water at 40° C. for 500 hours, and then measured for adhesion strength and evaluated on the criteria described below.

Criteria: ⊚: 26 kg/cm² or higher  ○: 21 to 25 kg/cm²
Δ: 16 to 20 kg/cm²  X: 15 to 10 kg/cm²
XX: 9 kg/cm² or lower Examples 1–4

Comparative Examples 1–3

The ingredients (A), (B), and (C), and optionally, ingredients (E), (F), (G), and sebacic acid as a viscosity-reducing agent, and further, calcium montanate as a release agent in an amount of 0.4 part by weight, were mixed in each composition ratio shown in Table 1, and melt kneaded in a 35φ double-screw extruder at a cylinder temperature of 270° C. and at a screw revolution speed of 70 rpm to give each inorganic reinforced polyamide resin composition, which was then extruded into pellets. The pellets thus obtained were dried in a hot-air dryer to a water content of 0.05% or lower, and then evaluated for various characteristics. The results of evaluation are shown in Table 1.

TABLE 1

|  |  |  | Example 1 | Example 2 | Example 3 | Example 4 | Comp. Ex. 1 | Comp. Ex. 2 | Comp. Ex. 3 |
|---|---|---|---|---|---|---|---|---|---|
| Resin compositions (part(s) by weight) | A | nylon 6 (relative viscosity, 1.7) | 28 | 28 |  |  |  | 28 |  |
|  |  | nylon 6 (relative viscosity, 2.2) |  |  | 26 |  |  |  | 30 |
|  |  | nylon 6 (relative viscosity, 2.8) |  |  |  | 28 | 34 |  |  |
|  |  | nylon 66 (relative viscosity, 2.6) |  |  |  |  |  | 12 |  |
|  | B | nylon 6T/6I | 12 |  | 14 |  | 6 |  |  |
|  |  | nylon TMD-T/6 |  | 12 |  | 12 |  |  | 10 |
|  | C | glass fiber | 30 | 30 | 30 | 30 | 30 | 30 | 60 |
|  |  | milled fiber |  |  | 15 |  |  |  |  |
|  |  | needle-shaped wollastonite | 15 | 15 |  | 15 | 15 | 15 |  |
|  |  | talc |  |  |  |  |  | 15 |  |
|  |  | mica | 15 | 15 | 15 | 15 |  | 15 |  |
|  |  | viscosity-reducing agent (sebacic acid) |  |  | 0.7 | 2.5 |  |  |  |
|  | E | carbon black | 3 | 5 | 5 | 5 | 2 | — | 0.5 |
|  | F | copper compound: cupric chloride | 0.09 | 0.02 | 0.05 | 0.05 | — | 0.05 | 0.8 |
|  | G | alkali metal halide compound: KI | 1 | 1.8 | — | 0.5 | — | — | 1 |
| Characteristics |  | relative viscosity of $H_2SO_4$ solution | 1.8 | 1.9 | 1.9 | 1.8 | 2.7 | 2.5 | 2.3 |
|  |  | crystallization temperature (TC2) with a temperature drop (° C.) | 173 | 175 | 170 | 173 | 190 | 234 | 186 |
|  |  | melt flow index (MFI) (g/10 min.) | 5.9 | 5.6 | 5.0 | 6.0 | 0.8 | 1.3 | 1.8 |
|  |  | tensile strength (MPa) | 172 | 185 | 190 | 175 | 183 | 172 | 206 |
|  |  | tensile modulus of elasticity (GPa) | 18.9 | 20.0 | 19.5 | 18.4 | 19.2 | 18.6 | 21.6 |
|  |  | evenness of embossed surface | ○ | ○ | ○ | ○ | x | x | x |
|  |  | specular gloss | 95 (○) | 96 (○) | 96 (○) | 98 (○) | 48 (x) | 40 (x) | 35 (x) |
|  |  | weathering resistance (specular gloss after SWOM 500 hr treatment) | 53 (○) | 55 (○) | 53 (○) | 60 (○) | 35 (Δ) | 24 (x) | 6 (x) |

Examples 5–9

Comparative Examples 4–7

The ingredients (A), (B), and (C), and optionally, organic compounds shown in Table 2 as ingredient (D) and sebacic acid as a viscosity-reducing agent, and further, calcium montanate as a release agent in an amount of 0.4 part by weight, were mixed in each composition ratio shown in Tables 3, 4, and melt kneaded in a 35φ double-screw extruder at a rein temperature of 260° C. to 300° C. and at a screw revolution speed of 40 to 60 rpm to give each inorganic reinforced polyamide resin composition, which was then extruded into pellets. The pellets thus obtained were dried in a hot-air dryer to a water content of 0.05% or lower, and then evaluated for various characteristics. The results of evaluation are shown in Tables 3 and 4.

TABLE 2

| Organic compounds | Hydroxyl-group concentration (wt %) | Glass transition temperature (° C.) | Molecular weight |
|---|---|---|---|
| Terpene phenol resin |  |  |  |
| dipentene-phenol copolymer[1] | 7.1 | 65 | 480 |
| α-pinene-phenol copolymer[2] | 6.1 | 87 | 1050 |
| dipentene-phenol copolymer[3] | 8.9 | 80 | 770 |
| Ethylene-vinyl alcohol copolymer[4] | 31 | 62 | >2000 |

In Table 2,
[1]YP-902 available from Yasuhara Chemical, Co., K.K.
[2]Polystar S145 available from Yasuhara Chemical, K.K.
[3]MacAce G150 available from Yasuhara Chemical, K.K.
[4]Soalight M available from The Nippon Synthetic Chemical Industry Co., Ltd.

TABLE 3

|  |  |  |  | Example 5 | Example 6 | Example 7 | Example 8 | Example 9 |
|---|---|---|---|---|---|---|---|---|
| Resin compositions (part(s) by weight) | A | nylon 6 (relative viscosity, 2.0) |  | 26 | 26 |  | 26 | 30 |
|  |  | nylon 6 (relative viscosity, 2.6) |  |  |  | 26 |  |  |
|  | B | nylon 6T/6I |  | 14 | 14 |  | 14 | 10 |
|  |  | TMD-T/6 |  |  |  | 14 |  |  |
|  | D | terpene phenol resin | YP-902 | 3 |  |  |  |  |
|  |  |  | Polystar S145 |  | 3 |  |  |  |
|  |  |  | MacAce G150 |  |  | 3 |  | 3 |
|  |  | ethylene-vinyl alcohol copolymer |  |  |  |  | 3 |  |
|  | C | glass fiber |  | 35 | 35 | 35 | 35 | 30 |
|  |  | milled fiber |  |  |  |  |  | 15 |
|  |  | needle-shaped wollastonite |  |  |  |  |  |  |
|  |  | talc |  |  |  |  |  | 15 |
|  |  | mica |  | 25 | 25 | 25 | 25 |  |
|  |  | viscosity-reducing agent (sebacic acid) |  |  |  | 0.6 | 0.6 |  |

TABLE 3-continued

|  |  | Example 5 | Example 6 | Example 7 | Example 8 | Example 9 |
|---|---|---|---|---|---|---|
| Characteristics | relative viscosity of $H_2SO_4$ solution | 1.8 | 1.8 | 1.7 | 1.8 | 1.8 |
|  | crystallization temperature (TC2) with a temperature drop (° C.) | 171 | 170 | 172 | 172 | 176 |
|  | melt flow index (MFI) (g/10 min.) | 5.9 | 6.0 | 7.6 | 5.9 | 6.0 |
|  | tensile strength (MPa) | 182 | 182 | 190 | 182 | 190 |
|  | tensile modulus of elasticity (GPa) | 18.6 | 18.9 | 19.2 | 18.6 | 18.2 |
|  | specular gloss | ○ (94) | ○ (95) | ○ (93) | ○ (94) | ○ (94) |
|  | coating adhesion (initial) | ⊚ | ⊚ | ⊚ | ○ | ⊚ |
|  | coating adhesion (after immersion in water) | ⊚ | ⊚ | ⊚ | ○ | ⊚ |

TABLE 4

|  |  |  | Comp. Ex. 4 | Comp. Ex. 5 | Comp. Ex. 6 | Comp. Ex. 7 |
|---|---|---|---|---|---|---|
| Resin compositions (part(s) by weight) | A | nylon 6 (relative viscosity, 2.0) |  |  | 30 | 26 |
|  |  | nylon 6 (relative viscosity, 2.6) | 40 | 40 |  |  |
|  | B | nylon 6T/6I |  |  | 10 | 14 |
|  |  | TMD-T/6 |  |  |  |  |
|  | D | terpene phenol resin |  |  |  |  |
|  |  | ethylene-vinyl alcohol copolymer |  | 3 |  |  |
|  | C | glass fiber | 60 | 60 | 60 | 30 |
|  |  | milled fiber |  |  |  | 15 |
|  |  | needle-shaped wollastonite |  |  |  |  |
|  |  | talc |  |  |  |  |
|  |  | mica |  |  |  | 15 |
|  |  | viscosity-reducing agent (sebacic acid) |  |  |  |  |
| Characteristics |  | relative viscosity of $H_2SO_4$ solution | 2.6 | 3.1 | 2.2 | 2.3 |
|  |  | crystallization temperature (TC2) with a temperature drop (° C.) | 234 | 233 | 185 | 195 |
|  |  | melt flow index (MFI) (g/10 min.) | 1.0 | 0.6 | 2.3 | 2.5 |
|  |  | tensile strength (MPa) | 235 | 230 | 235 | 180 |
|  |  | tensile modulus of elasticity (GPa) | 18.6 | 19 | 19.2 | 18.3 |
|  |  | specular gloss | x (30) | x (24) | Δ (63) | ○ (95) |
|  |  | coating adhesion (initial) | Δ | ○ | Δ | Δ |
|  |  | coating adhesion (after immersion in water) | x | ○ | x | x |

In Tables 1, 3, and 4, nylon 6T/6I: hexamethylene terephthalate/hexamethylene isophthalate, Grivory-G21 available from EMS JAPAN, K.K. The relative viscosity of nylon 6T/6I is 2.1.

TMD-T/6: a copolymer of trimethylhexamethylenediamine (TMD), terephthalic acid (T), and ε-caprolactam (6). The ratio of TMD-T/6 is 85/15 (weight ratio), and the relative viscosity thereof is 2.3.

glass fiber: RESO3-TP64T available from NIPPON GLASS FIBER CO., LTD.

milled fiber: REV-8 available from NIPPON GLASS FIBER CO., LTD. (average fiber diameter, 13 μm; average fiber length, 70 μm; surface treated with an amino silane)

needle-shaped wollastonite: NYGLOS-8 available from NYCO CORP. (average fiber diameter, 8 μm; average fiber length, 130 μm)

talc: MICRON #406 available from Hayashi Chemical Co. (average particle diameter, 4.5–6.0 μm)

mica: plate-shaped crystalline mica, M-325S available from REPCO CORP. (average particle diameter 18 μm; average aspect ratio, 20)

As can be seen from Tables 1, 3, and 4, the inorganic reinforced polyamide resin compositions of the present invention provided shaped articles having excellent strength and rigidity as well as excellent appearances (i.e., specular surface gloss and evenness of embossed surface) and further having excellent coating properties and weathering resistance, and required a mold temperature of 100° C. or lower in the preparation of shaped articles.

The inorganic reinforced polyamide resin compositions of the present invention having such excellent performance can suitably be used as engineering plastics for automobiles, electrical appliance and electronic parts, and other various applications, and can therefore make a great contribution to the industrial world.

What is claimed is:

1. An inorganic reinforced polyamide resin composition obtained by melt kneading of (A) a crystalline polyamide resin, (B) a semi-aromatic amorphous polyamide resin, and (C) an inorganic reinforcing material, wherein the relative viscosity of 96% sulfuric acid solution of the composition is 2.1 or lower and wherein the crystallization temperature (T2) of the composition as measured with a temperature drop by differential scanning calorimetry (DSC) is 180° C. or lower, wherein the crystalline polyamide resin has a relative viscosity of 1.6 to 2.1.

2. The inorganic reinforced polyamide resin composition according to claim 1, wherein the amount of crystalline polyamide rein (A) and semi-aromatic amorphous polyamide resin (B) contained in the composition is 30 to 50 parts by weight, relative to 100 parts by weight of ingredients (A), (B), and (C) in total.

3. The inorganic reinforced polyamide resin composition according to claim 1, wherein the amount of inorganic reinforcing material (C) contained in the composition is 50 to 70 parts by weight, relative to 100 parts by weight of ingredients (A), (B), and (C) in total.

4. The inorganic reinforced polyamide resin composition according to claim 1, wherein the melt flow index (MFI) of the composition at a water content of 0.05% or lower is 2.0 g/10 min. or higher.

5. The inorganic reinforced polyamide resin composition according to claim 1, wherein the inorganic reinforcing material is mica.

* * * * *

UNITED STATES PATENT AND TRADEMARK OFFICE
CERTIFICATE OF CORRECTION

PATENT NO. : 6,534,583 B1
DATED : March 18, 2003
INVENTOR(S) : Tamura et al.

It is certified that error appears in the above-identified patent and that said Letters Patent is hereby corrected as shown below:

<u>Title page,</u>
Item [57], ABSTRACT,
Line 3, change "rein" to -- resin --;

<u>Column 1,</u>
Line 5, change "FILED" to -- FIELD --;
Line 57, change "no good appearances." to -- a poor appearance. --;

<u>Column 2,</u>
Line 15, change "rein" to -- resin --;

<u>Column 3,</u>
Line 22, change "wollastonite, whiskers," to -- wollastonite whiskers, --;

<u>Column 4,</u>
Line 47, change "rein" to -- resin --;

<u>Column 5,</u>
Line 2, change "reins" to -- resins --;
Line 39, change "trimethyloletahne." to -- trimethylolethane. --
Line 44, change "invention, particularly" to -- invention, those particularly --;

<u>Column 6,</u>
Line 48, change "to," to -- either, --;

<u>Column 12,</u>
Line 58, change "rein" to -- resin --.

Signed and Sealed this

Twenty-third Day of December, 2003

JAMES E. ROGAN
*Director of the United States Patent and Trademark Office*